No. 794,879. PATENTED JULY 18, 1905.
J. M. PADGETT.
RIM FOR WHEELS.
APPLICATION FILED JAN. 16, 1905.
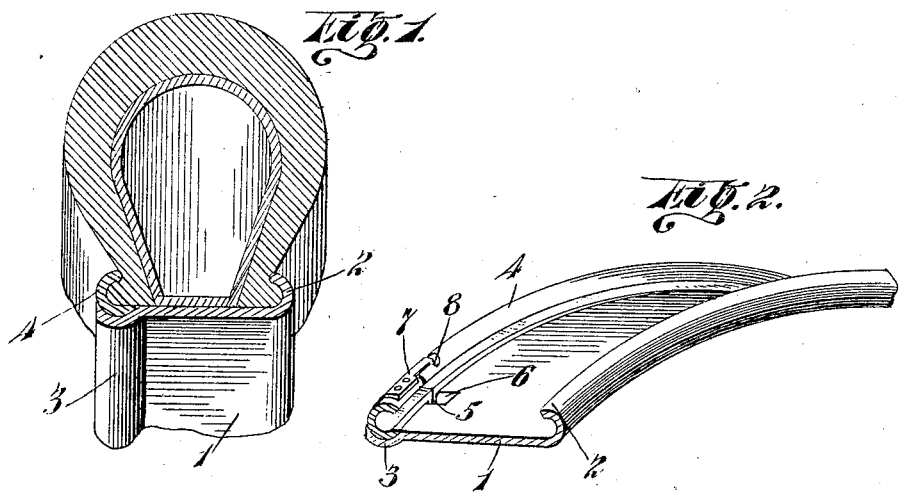
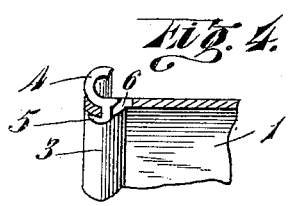
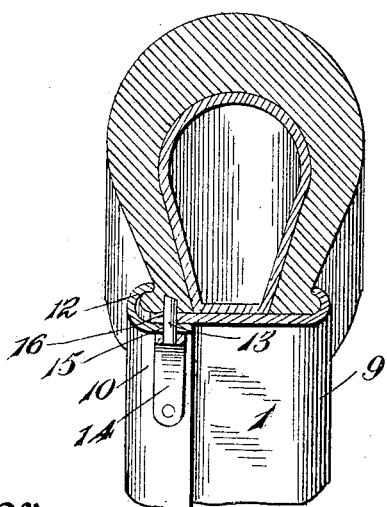
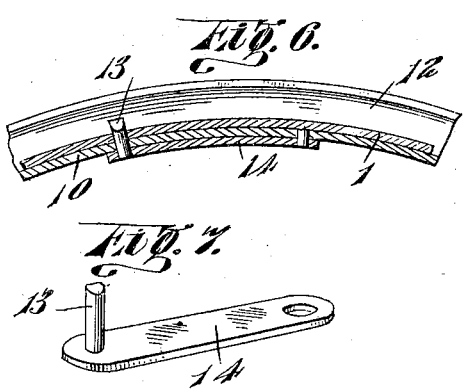
Witnesses
Inventor
James M. Padgett.
by H. B. Willson
Attorney No. 794,879.  
Patented July 18, 1905.

UNITED STATES PATENT OFFICE.

JAMES MILLARD PADGETT, OF TOPEKA, KANSAS.

RIM FOR WHEELS.

SPECIFICATION forming part of Letters Patent No. 794,879, dated July 18, 1905.

Application filed January 16, 1905. Serial No. 241,376.

*To all whom it may concern:*

Be it known that I, JAMES MILLARD PADGETT, a citizen of the United States, residing at Topeka, in the county of Shawnee and State of Kansas, have invented certain new and useful Improvements in Rims for Pneumatic and Solid Tired Wheels; and I do declare the following to be a full, clear, and exact description of the invention, such as will enable others skilled in the art to which it appertains to make and use the same.

This invention relates to improvements in rims for pneumatic or solid tired wheels.

The object of the invention is to provide a rim having a detachable clenching-flange which when in position will securely hold the tire in place and which may be readily removed to permit the tire to be slipped from the rim without injury from stretching it over the flange.

A further object is to provide means whereby the clenching-flange is detachably secured to the wheel-rim and to prevent the tire from pulling off the rim or creeping.

With these and other objects in view the invention consists of certain novel features of construction, combination, and arrangement of parts, as will be hereinafter described and claimed.

In the accompanying drawings, Figure 1 is a cross-sectional view through a wheel-rim constructed in accordance with the invention. Fig. 2 is a perspective view of a portion of the rim, the tire being left off. Fig. 3 is a longitudinal vertical sectional view through the meeting ends of the detachable flange and the rim below the same. Fig. 4 is a detail cross-section through the rim, taken between the meeting ends of the detachable ring or band. Fig. 5 is a cross-sectional view through a wheel-rim, showing a modified construction and arrangement of the tire-clenching flange. Fig. 6 is a longitudinal vertical sectional view through a portion of the wheel-rim and the clenching-flange, showing the manner of securing said flange on the rim; and Fig. 7 is a detail perspective view of one of the locking-pins and spring-support for the form of flange shown in Figs. 5 and 6 of the drawings.

Referring more particularly to Figs. 1, 2, 3, and 4 of the drawings, 1 denotes the wheel-rim having on one edge an integrally-formed outwardly - projecting inwardly - curved clenching-flange 2. Adjacent to its opposite edge the flange is provided with an annular groove or channel 3, with which is adapted to be engaged a detachable open substantially U-shaped clenching-ring or band 4. The inner sides of the meeting ends of said ring or band are provided with inwardly-projecting right-angularly-disposed hook-shaped attaching-lugs 5, which are adapted to be engaged with a slot or aperture 6, formed in the groove or channel 3 of the rim 1. The hook-shaped lug at one end of the ring or band 4 is inserted in slot or aperture 6, when the right-angularly-disposed lug on opposite end of said ring or band 4 drops into the same slot in rim 1 and automatically locks said ring or band 4 to rim 1, so that when lip of the tire is forced into clenching-rim by inflation it cannot be removed until tire is deflated and the lip of the tire forced inwardly and out of the clench of ring or band 4. One end of the ring or band 4 has secured thereto a longitudinally-projecting hook 7, which is adapted to be engaged with a recess 8, formed in the opposite end of the ring or band, when said ends are brought together around the rim 1. When it is desired to remove the ring or band 4 to permit the tire to be slipped off of the rim, the tire is first deflated, then forced inwardly till the lip is out of the clenching-ring. The hook 7 may then be disengaged from the recess 8, after which the lugs 5 may be withdrawn from the slot or aperture 6. The tire may then be slipped off.

In Figs. 5 and 6 of the drawings is shown a modified construction and arrangement of detachable retaining ring or band. In this instance, the rim 1 is provided on one edge with an outwardly - projecting inwardly-curved flange 9, similar to the curved flange 2 shown in the first figures of the drawings. In this latter form of rim the groove or channel 3 is dispensed with and in place of the open ring or band 4 is provided an integrally-formed ring or band 10, on one side of which is formed an outwardly-projecting inwardly-curved flange 12. The ring or band 10 is adapted to be slipped into the rim 1, the flange 12 thereon projecting outwardly beyond the surface of the rim and corresponding to the flange 9 on the opposite side thereof. In order that the ring or band 10 may be removably connected with the rim, said band is provided with a series of locking-pins 13, which are secured to the ends of short leaf-springs 14. The opposite ends of said springs are secured to the inner surface of the ring or band 10, as shown. The pins 13 are adapted to project through apertures 15, formed in the ring or band 10, and to engage apertures 16, formed in the rim 1 when said band is in position upon the rim. The outer ends of the pins 13 are beveled, so that when engaged by the edge of the rim or band 10 and inserted therein, said pins will be forced inwardly against the tension of the springs 14 until the apertures 16 of the rim are brought opposite thereto, when said pins will spring into the apertures 16, thereby locking the ring or band upon the rim of the wheel. The pins 15 are preferably of such length as to project into the lip of the tire, thereby preventing the tire from pulling off, creeping, or slipping around on the rim. Any suitable number of the spring locking-pins may be used to hold the flange and tire in place, only one of the same being shown in the drawings.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a wheel of the character described, the combination with the rim having on one edge an integrally-formed retaining-flange and adjacent to its opposite edge an annular groove or channel, a substantially U-shaped, open retaining ring or band, arranged in said groove, inwardly-projecting right-angularly-disposed hook-shaped lugs formed on the meeting ends of said ring or band to engage a slot in said rim, and a hook arranged on one end of said ring or band to engage a recess in the opposite end of the same whereby said band is removably secured to the rim, substantially as described.

2. In a wheel of the character described, the combination of the rim having on one edge an integrally-formed retaining-flange and adjacent to its opposite edge an annular groove or channel, a retaining ring or band arranged in said groove and provided with hook-shaped lugs at the meeting ends thereof and a hook arranged on one end of said ring to engage a recess in the opposite end of the same, substantially as described.

In testimony whereof I have hereunto set my hand in presence of two subscribing witnesses.

JAMES MILLARD PADGETT.

Witnesses:
MARTIN WALTER,
Miss V. JONES.